(No Model.)
F. B. GOULD.
LOCKET.
No. 277,022. Patented May 8, 1883.
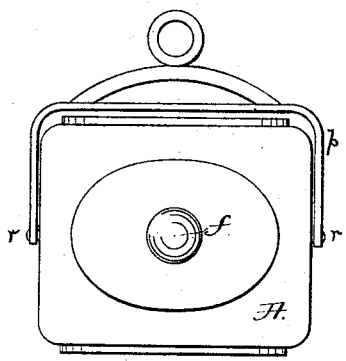
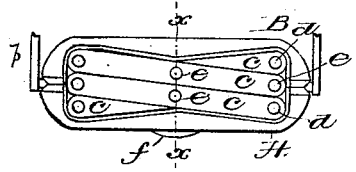
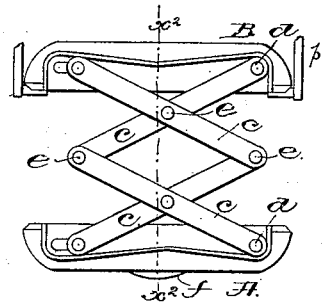
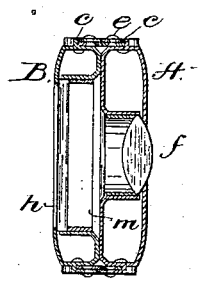
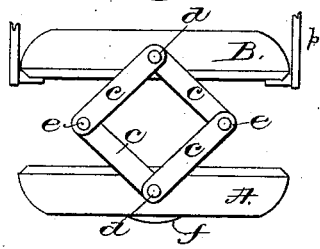
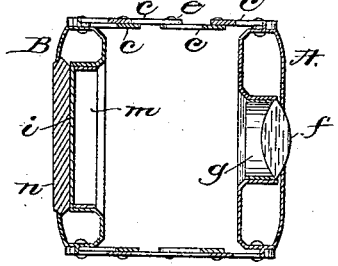
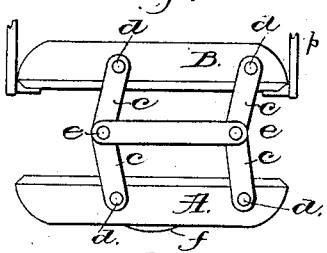
Witnesses.
Fred A. Powell.
John F. C. Prinkert
Inventor:
Forrest B. Gould.
by Crosby & Gregory attys.

UNITED STATES PATENT OFFICE.

FORREST B. GOULD, OF BOSTON, MASSACHUSETTS.

LOCKET.

SPECIFICATION forming part of Letters Patent No. 277,022, dated May 8, 1883.

Application filed February 19, 1883. (No model.)

*To all whom it may concern:*

Be it known that I, FORREST B. GOULD, of Boston, county of Suffolk, State of Massachusetts, have invented an Improvement in Lockets, of which the following description, in connection with the accompanying drawings, is a specification, like letters on the drawings representing like parts.

My invention has for its object the construction of a locket which shall be adapted to receive a picture or other thing to be magnified, the said locket having a magnifying-glass made adjustable toward or from the picture to be viewed.

My invention consists in an extensible locket, and also in an extensible locket provided with a picture-holding portion and with a magnifying-glass, the construction of the locket being such as to permit the glass to be adjusted to place at the proper focal distance from the picture.

Figure 1, in side elevation, represents a locket embodying my invention; Fig. 2, a top view thereof; Fig. 3, a like view, with the locket extended or opened; Fig. 4, a section of Fig. 2 on the dotted line $x\ x$; Fig. 5, a section on the dotted line $x^2$, Fig. 3, the said figure, however, showing my locket as containing a ferrotype instead of a photograph, as in Fig. 4; and Figs. 6 and 7 are modifications.

My improved locket is composed of two halves or portions, A B; but instead of hinging the said halves together, as usual, I connect them by a series of jointed links, $c\ c$, attached to the halves A B at $d$ and to each other at $e$, so that the portions A B may be more or less separated one from the other, or, in other words, so that the locket may be extended or lengthened from the position Fig. 2 to the position Fig. 3. The portion A contains a magnifying-glass, $f$, held on its seat by a ring, $g$, and the portion B has a suitable seat to receive either a photographic transparency, $h$, or a photograph on glass, or to receive, as in Fig. 5, a ferrotype, $i$, the said portion B having a suitable ring or device, $m$, to hold the parts $h$ or $i$ in place.

In connection with the photographic transparency I may intend to use a screen such as referred to in a patent of the United States, No. 271,838, granted to me February 6, 1883, to which reference may be had.

When a ferrotype is to be exhibited I prefer to place outside of it a stone, $n$, or other slab, for purposes of ornament. The picture to be received having been properly mounted in the portion B, the portion A, containing the magnifying-glass, may be so moved as to place the said glass at the proper focal distance from the picture, when the latter may be viewed.

I have shown the connecting devices between the two portions A B as constructed in different ways, each of which will be fully understood by the drawings; and it is obvious that yet other variations of connecting devices, whereby the locket may be made extensible, as described, may be employed, and I do not desire to limit my invention to the exact construction of such devices as I have herein shown. The locket is held by the pivots $r$ of the bail $p$.

I claim—

1. As an improved article of manufacture, an extensible locket, substantially as described.

2. The extensible locket having picture-receiving portion combined with a magnifying-glass, substantially as and for the purpose described.

In testimony whereof I have signed my name to this specification in the presence of two subscribing witnesses.

FORREST B. GOULD.

Witnesses:
  G. W. GREGORY,
  W. H. SIGSTON.